Patented Sept. 20, 1949

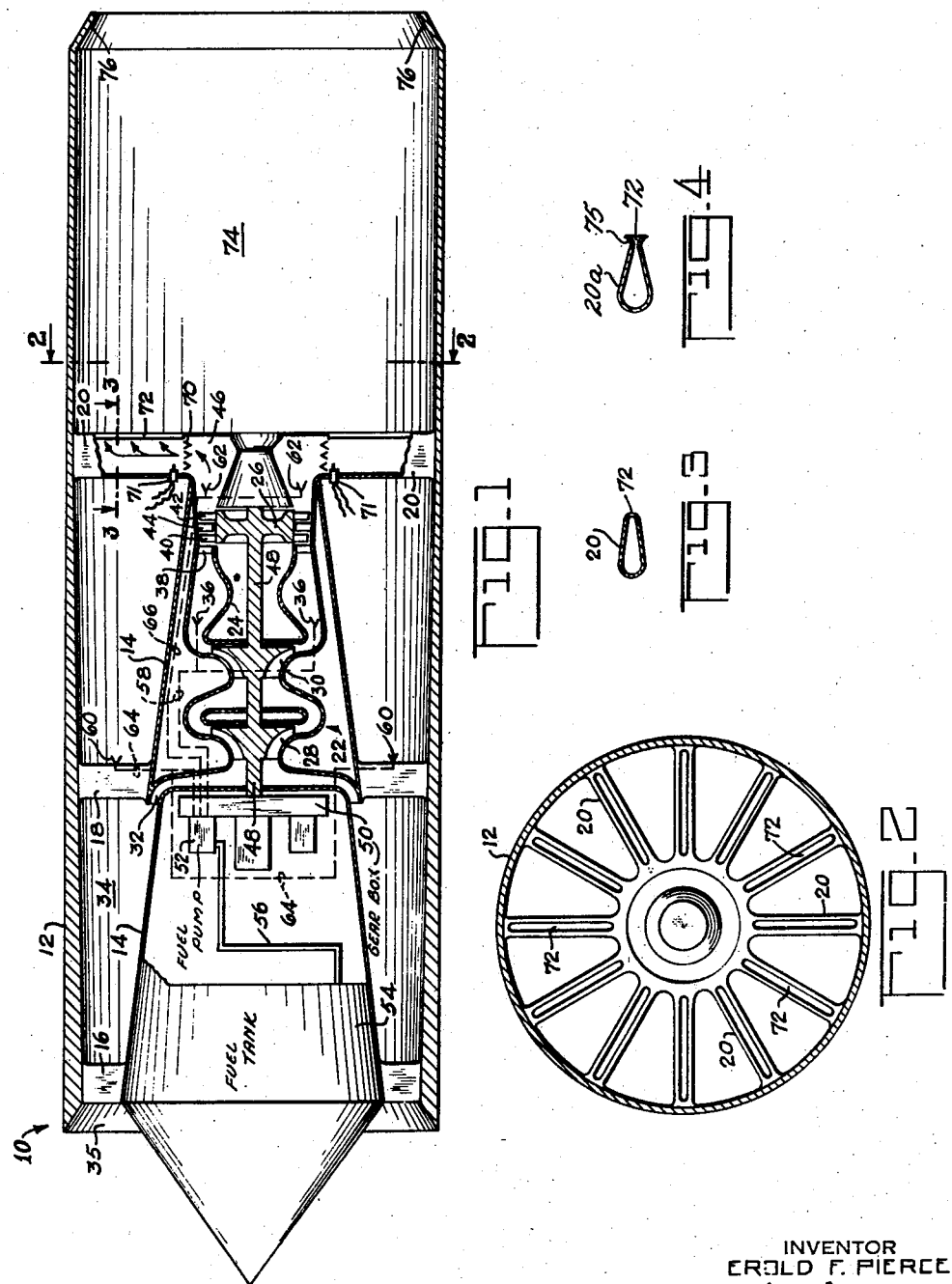

2,482,505

UNITED STATES PATENT OFFICE 2,482,505

MECHANISM PROVIDING A RAM JET ENGINE WITH A PILOT FLAME AND WITH A DRIVE FOR ITS AUXILIARY EQUIPMENT

Erold F. Pierce, Paterson, N. J., assignor to Wright Aeronautical Corporation, a corporation of New York Application September 13, 1947, Serial No. 773,811

14 Claims. (Cl. 60—35.6)

1

This invention relates to jet type internal combustion engines for jet propulsion of vehicles such as aircraft. That is, the invention is directed to engines which essentially comprise a duct into which air, under pressure, enters as a result of forward motion of the vehicle for said engine. Fuel is mixed with said air and ignited, and the products of combustion discharge from the rear end of said duct to provide the engine and its vehicle with forward thrust.

Unlike most internal combustion engines, certain jet engines as for example a ram jet engine, have no rotating torque transmitting parts and instead merely provide forward propulsive thrust. Accordingly, in such jet engines the power for operating various engine auxiliaries—such as fuel pumps, oil pumps, etc.—must be supplied from some external source, as for example electric batteries. An object of the invention comprises the provision of a gas turbine power plant within a housing co-axially disposed within the duct of a jet engine, said gas turbine receiving its air from the air inlet of said jet engine and providing the power to drive said auxiliary equipment. In accordance with a further object of the invention, fuel is introduced into the exhaust duct of the gas turbine and, after its ignition, the burning combustion mixture discharges into the combustion chamber of the jet engine to act as a continuously burning pilot flame therefor.

Other objects of the invention will become apparent upon reading the annexed detailed description in connection with the drawing in which:

Figure 1 is a diagrammatic axial sectional view through an engine embodying the invention;

Figures 2 and 3 are views taken along lines 2—2 and 3—3 respectively of Figure 1; and Figure 4 illustrates a modification of Figure 3.

Referring to the drawing, a ram jet engine 10 comprises a duct or hollow member 12 and a central housing 14 concentrically supported within said duct by radially disposed arms 16, 18, and 20. An auxiliary gas turbine power plant is mounted within said housing 14, said power plant providing the power to drive auxiliary equipment for the engine 10 and its vehicle.

The gas turbine power plant within the housing 14 comprises the usual components: namely, an air compressor 22, a combustion chamber 24, and a turbine rotor 26. As illustrated the compressor 22 comprises a centrifugal type compressor having a first stage 28 and a second stage 30. Air for the compressor 22 is supplied through an inlet duct 32 opening forwardly within the annular air passage 34 about the housing 14 a substantial distance downstream of the inlet opening 35 of the passage 34. The compressor 22 discharges its compressed air into the turbine combustion chamber 24. Fuel is supplied to the combustion chamber 24 through suitable nozzles schematically indicated at 36 and the discharge end of the combustion chamber 24 is provided with suitable guide vanes 38 for directing the combustion gases against the first-stage turbine rotor blades 40. As illustrated, the turbine rotor is also provided with second-stage rotor blades 42, spaced from the first stage blades 40, to accommodate stator blades 44 therebetween. The turbine exhaust gases discharge rearwardly, from the turbine rotor blades, into an annular exhaust duct 46. The details of the air compressor 22, combustion chamber 24, and the turbine rotor 26 obviously form no part of the present invention.

The turbine rotor shaft 48 is drivably connected to the compressor 22 and to a suitable gear box 50 for driving engine auxiliary equipment—such as fuel pumps, oil pumps, etc.—a fuel pump or pumps being indicated at 52. The forward portion of the central housing 14 may contain a fuel tank 54 communicating with the inlet side of the pump or pumps 52 through a conduit 56. The pump or pumps 52 supply fuel to the nozzles 36 of the gas turbine combustion chamber 24 through conduits schematically indicated by the dot and dash lines 58. In addition said pump or pumps 52 supply fuel to nozzles 60 and 62 through conduits schematically indicated by dot and dash lines 64 and 66 respectively. Suitable valves or other means may be provided to control the quantity of fuel supplied to said nozzles. The fuel nozzles 60 comprise the main fuel nozzles for the ram jet engine 10 and are disposed on the support arms 18 immediately down-stream of the inlet end of the gas turbine air duct 32. In addition the fuel nozzles 62 add fuel to the exhaust gases in the gas turbine exhaust duct 46 to provide for a so-called "after burning" of the gas turbine exhaust.

From the exhaust duct 46, the turbine exhaust and the fuel mixed therewith flows radially out through the hollow arms 20 and over conventional flame holders 70 disposed in said arms. In general, a flame holder is nothing more than a blunt body or bodies disposed in the flow path of a high velocity fuel mixture such that each of said bodies, on its down-stream side, creates a region of large turbulence and low average velocity whereby, once ignited, a small flame will remain there to serve as a source of continuous ignition of the main stream of combustion gases.

As is conventional, the gas turbine 26 operates with a large amount of excess air which combines with the fuel introduced in the after burners 62 to form a combustible mixture. The temperature of the turbine exhaust gases in the exhaust duct 46 may be above the ignition temperature of the combustion mixture formed by the introduction of fuel therein through the after burners 62. Preferably, however, suitable ignition means—as for example an electric spark gap 71—is disposed at the flame holders 70 for igniting the combustion mixture at said flame holders. In either case the combustion mixture ignites on the down-stream side of the flame holders 70 and the burning combustion gases flow radially through the hollow arms 20. The arms 20 are provided with narrow elongated slots 72 on their down-stream sides through which the burning exhaust gases discharge, thereby acting as pilot flames for igniting the combustion gases in the combustion chamber 74 of the ram jet engine 10. The jet action of the burning gases discharging from the narrow slots 72 causes local turbulence, thereby facilitating ignition of the combustion gases in the chamber 74 and acting as flame holders to maintain said ignition. If necessary, the arms 20 may be formed to introduce additional turbulence of the combustion mixture on their down-stream sides to insure its ignition by the pilot-flame emanating from the slots 72. For example in Figure 4 the arm 20a corresponds to the arms 20 of Figures 1-3 but the arm 20a has been provided with flanges 75 to cause said turbulence. Obviously the magnitude of the turbulence created by the arms 20 or 20a depends largely on the extent to which said arms depart from a streamlined profile.

As illustrated, the ram jet combustion chamber 74 is disposed down-stream or to the rear of the gas turbine housing 14. Also the main fuel nozzles 60, for the ram jet, are disposed immediately down-stream of the air intake duct 32 for the gas turbine, while the pilot flame for the ram jet combustion chamber emanates from the arms 20 disposed at the down-stream end of the gas turbine housing 14. In this way a substantial axial distance is provided between said main fuel nozzles 60 and said pilot flames in order to obtain a thorough mixing of the ram jet fuel and air prior to ignition by said pilot flames.

Combustion within the chamber 74 introduces a large quantity of heat to the ram jet motive fluid, whereby said fluid or combustion gases discharges rearwardly at high velocity through the ram jet discharge opening 76 thereby providing the ram jet with forward propulsive thrust.

As illustrated, the facing walls of the housing 14 and duct 12 diverge away from each other whereby the annular passage 34 therebetween acts as a diffuser. That is, a substantial proportion of the velocity head of the air entering the inlet opening 35 of the passage 34 is converted into pressure head in said passage. The gas turbine air inlet duct 32 communicates with the passage 34 downstream of its inlet 35 whereby the velocity head of the entering air is materially reduced before entering the compressor. This feature is particularly important where the ram jet is intended to operate at super-sonic velocities.

With the aforedescribed arrangement, a gas turbine is disposed within a housing 14 co-axially supported within the duct of a ram jet engine. Said turbine takes its air supply from the air inlet of the ram jet and discharges its exhaust into the combustion chamber of the ram jet for ignition of the ram jet combustion mixture. In this way the gas turbine not only provides a continuous pilot flame for igniting the combustion mixture of the ram jet, but in addition the gas turbine provides a source of power for driving various engine and vehicle auxiliary equipment. Since the main air inlet 34 is many times the size required for the gas turbine, it is possible to operate the gas turbine while the jet engine 10 is stationary, thereby providing the power to drive various auxiliary equipment and providing a pilot flame for the ram jet engine prior to launching said engine.

The invention is not limited to the ram or athodyd type jet engine illustrated but is equally applicable to all types of jet engines having no rotating torque transmitting parts in which air for combustion is taken in from the surrounding atmosphere, heat is added to the air, and the resulting fluid is discharged rearwardly at high velocity to provide the jet engine with forward propulsive thrust.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination: a jet engine comprising a duct-like member; a heat engine having rotatable power-transmitting parts and an exhaust duct; and means for introducing fuel into said exhaust duct for combustion therein, said exhaust duct being arranged to discharge the burning mixture into the combustion chamber of said jet engine to act as a pilot flame therefor.

2. In combination: a jet engine comprising a duct-like member; a heat engine having rotatable power-transmitting parts and an exhaust duct; means for introducing fuel into said exhaust duct for combustion therein, said exhaust duct being arranged to discharge the burning mixture into the combustion chamber of said jet engine to act as a pilot flame therefor; and auxiliary equipment, for said jet engine, drivably connected to said heat engine.

3. In combination: a jet engine having a combustion chamber; a gas turbine engine having an exhaust duct; and means for introducing fuel into said exhaust duct for combustion therein; said exhaust duct being arranged to discharge at least part of the burning mixture into said combustion chamber to provide a pilot flame therefor.

4. In combination: a jet engine having a combustion chamber; a gas turbine engine having an exhaust duct; means for introducing fuel into said exhaust duct for combustion therein; said exhaust duct being arranged to discharge at least part of the burning mixture into said combustion chamber to provide a pilot flame therefor; and auxiliary equipment, for said jet engine, drivably connected to said turbine.

5. In combination: a jet engine having a combustion chamber; a gas turbine engine having an exhaust duct; means for introducing fuel into said exhaust duct for combustion therein; said exhaust duct having a plurality of small discharge openings arranged to discharge the burning mixture into said combustion chamber to provide a pilot flame therefor.

6. In combination: a jet engine comprising a duct-like member having a combustion chamber; a housing symmetrically disposed within said member; a gas turbine engine disposed within said housing; said turbine having an exhaust duct; and means for introducing fuel into said exhaust duct for combustion therein; said exhaust duct being arranged to discharge the burning mixture into said combustion chamber to provide a pilot flame therefor.

7. In combination: a jet engine comprising a duct-like member having a combustion chamber; a housing symmetrically disposed within said member; a gas turbine engine disposed within said housing; said turbine having an exhaust duct; means for introducing fuel into said exhaust duct for combustion therein; said exhaust duct being arranged to discharge the burning mixture into said combustion chamber to provide a pilot flame therefor; and auxiliary equipment, for said jet engine, drivably connected to said turbine.

8. In combination: a jet engine comprising a duct-like member having a forwardly directed air inlet opening, a combustion chamber, and a rearwardly directed discharge opening; a housing symmetrically supported within said member forwardly of said combustion chamber; a gas turbine engine disposed within said housing; a plurality of gas turbine exhaust passages extending outwardly from said housing toward the walls of said duct-like member; means for introducing fuel into the gas turbine exhaust for combustion therein; said outwardly extending exhaust passages being arranged to discharge the burning mixture into said combustion chamber to provide a pilot flame therefor.

9. A jet engine comprising a duct-like member; a housing symmetrically disposed within and adjacent to the forward end of said member; said housing and member being shaped so that the annular passage therebetween diverges toward the down-stream end of said housing; a combustion chamber within said member down-stream of said housing; a heat engine disposed within said housing; said engine having rotatable power-transmitting parts and having a forwardly directed annular air intake communicating with said annular passage down-stream of the minimum cross-sectional area portion of said passage; an exhaust duct for said heat engine; and means for introducing fuel into said exhaust duct for combustion therein, said exhaust duct being arranged to discharge the burning mixture into said combustion chamber to provide a pilot flame therefor.

10. A jet engine comprising a duct-like member having a combustion chamber therein; a housing disposed within said member; a heat engine disposed within said housing; said engine having rotatable power-transmitting parts, a combustion chamber, and an exhaust duct; pump means for supplying fuel to both of said combustion chambers and to said exhaust duct; the fuel supplied to said exhaust duct forming a combustion mixture for ignition therein; said exhaust duct being arranged to discharge the burning mixture into said first mentioned combustion chamber to act as a pilot flame therefor; and means drivably connecting said pump means to said heat engine.

11. A jet engine comprising a duct-like member having a combustion chamber; a housing symmetrically supported within said member adjacent the forward end thereof; a fuel tank adjacent the front end of said housing; a heat engine disposed within said housing; said heat engine having a combustion chamber; an exhaust duct for said heat engine; pump means within said housing for supplying fuel to both of said combustion chambers and to said exhaust duct; the fuel supplied to said exhaust duct forming a combustion mixture for ignition therein; said exhaust duct being arranged to discharge the burning mixture into said first mentioned combustion chamber to act as a pilot flame therefor; and means drivably connecting said pump means to said heat engine.

12. In combination: a jet engine comprising a duct-like member; a housing symmetrically disposed within and adjacent the forward end of said member; said housing and member being so shaped that the annular passage therebetween diverges toward the downstream end of said housing; said jet engine having a combustion chamber within said member down-stream of said housing; a gas turbine engine disposed within said housing; said turbine engine having a forwardly directed annular air intake communicating with said annular passage down-stream of the minimum cross-sectional area portion of said passage; said turbine engine also having an exhaust duct; and means for introducing fuel into said exhaust duct for combustion therein; said exhaust duct being arranged to discharge the burning mixture into said combustion chamber to provide a pilot flame therefor.

13. In combination: a jet engine comprising a duct-like member; a housing symmetrically disposed within and adjacent the forward end of said member; said housing and member being so shaped that the annular passage therebetween diverges toward the down-stream end of said housing; said jet engine having a combustion chamber within said member down-stream of said housing; a gas turbine engine disposed within said housing; said turbine engine having a forwardly directed annular air intake communicating with said annular passage downstream of the minimum cross-sectional area portion of said passage; said turbine engine also having an exhaust duct; means for introducing fuel into said exhaust duct for combustion therein; said exhaust duct being arranged to discharge the burning mixture into said combustion chamber to provide a pilot flame therefor; and auxiliary equipment, for said jet engine, drivably connected to said turbine.

14. In combination: a jet engine comprising a duct-like member having a forwardly directed air inlet opening, a combustion chamber, and a rearwardly directed discharge opening; a housing symmetrically disposed within and adjacent to the forward end of said member forwardly of said combustion chamber; said housing and member being so shaped that the annular passage therebetween diverges toward the down-stream end of said housing; a fuel tank adjacent to the front end of said housing; a gas turbine engine disposed within said housing rearwardly of said fuel tank; said gas turbine engine having a forwardly directed annular air intake opening communicating with said annular passage down-stream of the inlet end of said passage; an exhaust duct for said gas turbine engine; pump means for supplying fuel to said combustion chamber, gas turbine and exhaust duct; the fuel supplied to said exhaust duct forming a combustion mixture for ignition therein; said exhaust duct being arranged to discharge the burning mixture into said combustion chamber to act as a pilot flame therefor, and means drivably connecting said gas turbine engine to said pump means.

EROLD F. PIERCE.

REFERENCES CITED

The following references are of record in the file of this patent:

FOREIGN PATENTS

| Number | Country | Date |
|--------|---------|------|
| 818,703 | France | June 21, 1937 |